June 7, 1955 — E. W. PLUMB — 2,709,925

SAFETY GUARD FOR PRESSES

Filed June 4, 1952 — 3 Sheets-Sheet 1

INVENTOR.
EDWIN W. PLUMB
BY
ATTORNEY.

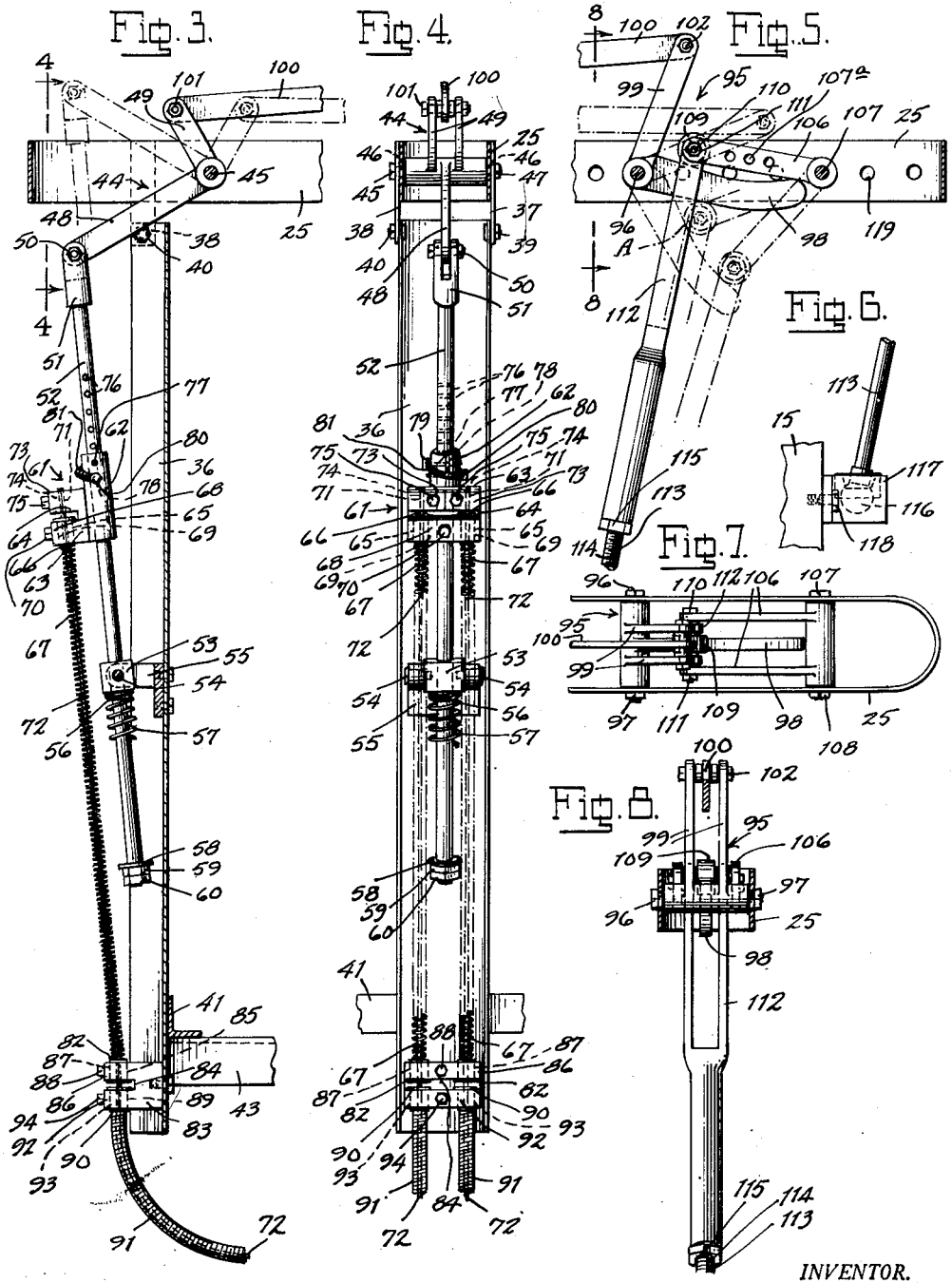

June 7, 1955  E. W. PLUMB  2,709,925
SAFETY GUARD FOR PRESSES
Filed June 4, 1952  3 Sheets-Sheet 3
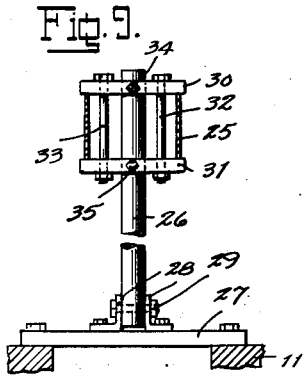
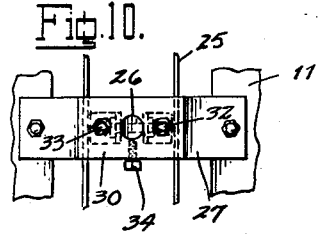
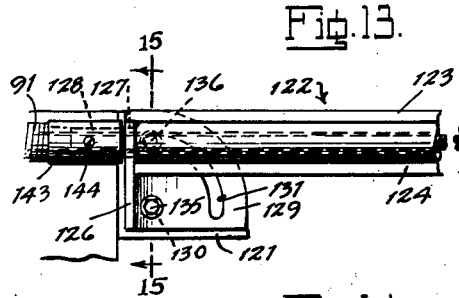
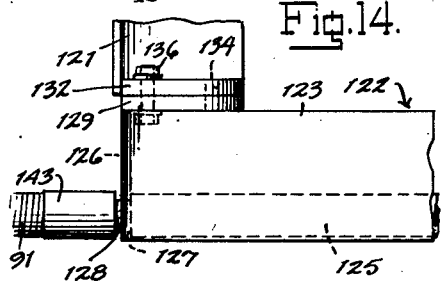
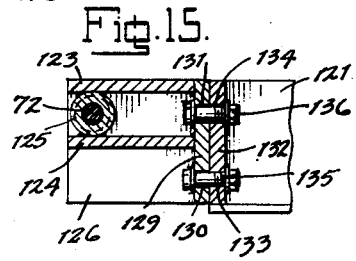
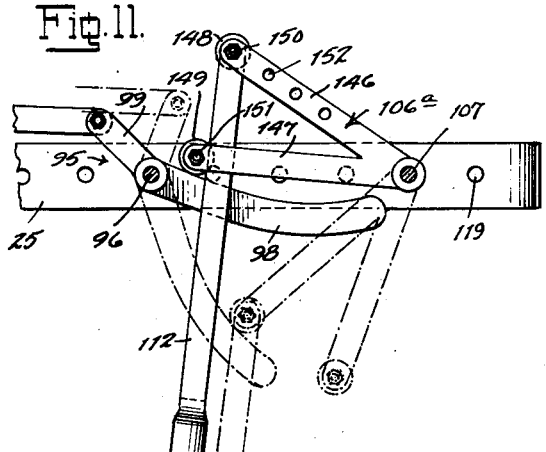
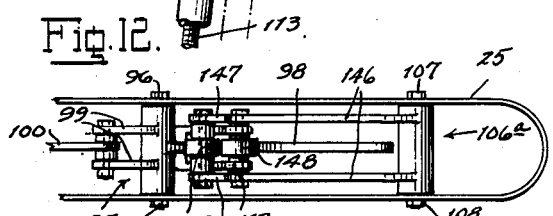
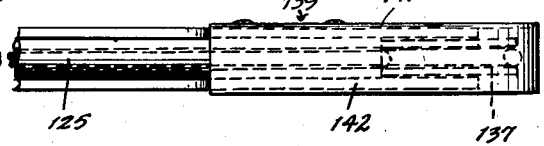
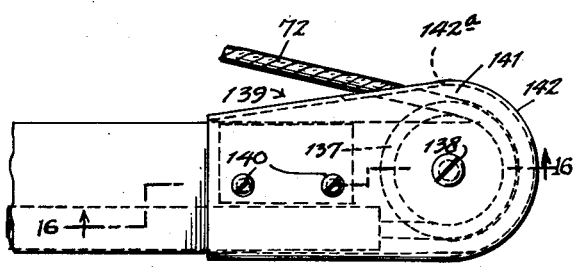
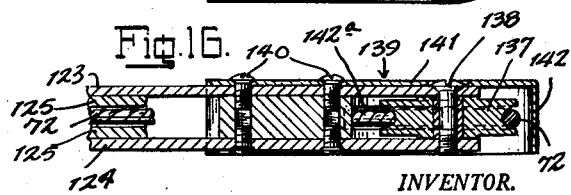
INVENTOR.
EDWIN W. PLUMB
BY
ATTORNEY.

United States Patent Office 2,709,925
Patented June 7, 1955

2,709,925

SAFETY GUARD FOR PRESSES

Edwin W. Plumb, Morris, Conn.

Application June 4, 1952, Serial No. 291,619

15 Claims. (Cl. 74—615)

This invention relates to a safety guard for presses particularly of the type wherein the hands of the operator are connected to wristlets provided upon the ends of cables, the latter being mechanically connected to the press head to cause the wristlets to be pulled with each descending operation of the head.

It is an object of the present invention to provide an improved mechanism for this purpose, wherein the working space provided for the operator is free from mechanically movable parts of the safety apparatus, such as levers and the like, so that the purpose of the guard in protecting the hands of the operator against injury is not nullified by moving parts of the guard apparatus which may themselves cause injury.

It is a further object to provide a guard apparatus which may be conveniently attached to standard type presses and is adjustable to accommodate different dimension and operating requirements.

A further object is to provide a guard apparatus in which the action of withdrawing the hands is only sufficient to remove the hands out of danger without excessive pullback and violent action, thereby relieving the operator of the shock and strain to which he would otherwise be subject. To this end, it is particularly proposed to provide mechanism which will operate to pull back the hands at the beginning of the downward movement of the press head and will not continue to withdraw the hands as the head continues to descend.

It is a further object to provide means whereby the amount of pull-out may be adjusted to any desired extent from zero to a maximum withdrawal, so that the apparatus may be precisely adjusted to the requirements of particular press operation jobs, some of which require that the part being worked upon be held by the hands during the press operation. In this latter case, the adjustability of the device is such that the hands will be held out of the path of the press head, but no withdrawing action will be applied thereto.

Another object is to provide convenient means for adjusting the position of the wristlets with respect to the work to suit different tools or operators.

Another object is to provide side arms mounted upon the press and disposed at each side of the operator, from which the wristlet carrying cables extend forwardly. It is further proposed to provide such side arms adjustably mounted upon the press, so that, in the case of tilting the press from its normal vertical position, the side arms may be adjusted to remain in their normal horizontal position with respect to the operator.

Other objects and advantages of the invention will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

Fig. 3 is a side elevation on an enlarged scale of the pull-out mechanism provided at the rearward side of the press, the frame portions being shown in vertical section;

Fig. 4 is a rear elevation of the parts as shown in Fig. 3, being partially in vertical section along the line 4—4 of Fig. 3;

Fig. 5 is a side elevation of the inverse cam operating lever employed at the forward side of the press, the frame portion being shown in vertical section;

Fig. 6 is a detail side elevation of the swivel joint connection of the pull rod employed, and which is connected to the head of the press;

Fig. 7 is a top plan view of the parts as shown in Fig. 5;

Fig. 8 is a vertical sectional view taken along the line 8—8 of Fig. 5;

Fig. 9 is a vertical sectional view on an enlarged scale, taken along the line 9—9 of Fig. 1, and showing the mounting post for the upper frame part;

Fig. 10 is a plan view of the parts as shown in Fig. 9;

Fig. 11 is a view similar to Fig. 5 and showing a modified form of inverse cam mechanism;

Fig. 12 is a top plan view thereof;

Fig. 13 is a side elevation, on a further enlarged scale and partially broken away, of one of the side arms;

Fig. 14 is a top plan view thereof;

Fig. 15 is a vertical sectional view taken along the line 15—15 of Fig. 13; and

Fig. 16 is a longitudinal vertical sectional view taken along the line 16—16 of Fig. 14.

Figure 1:
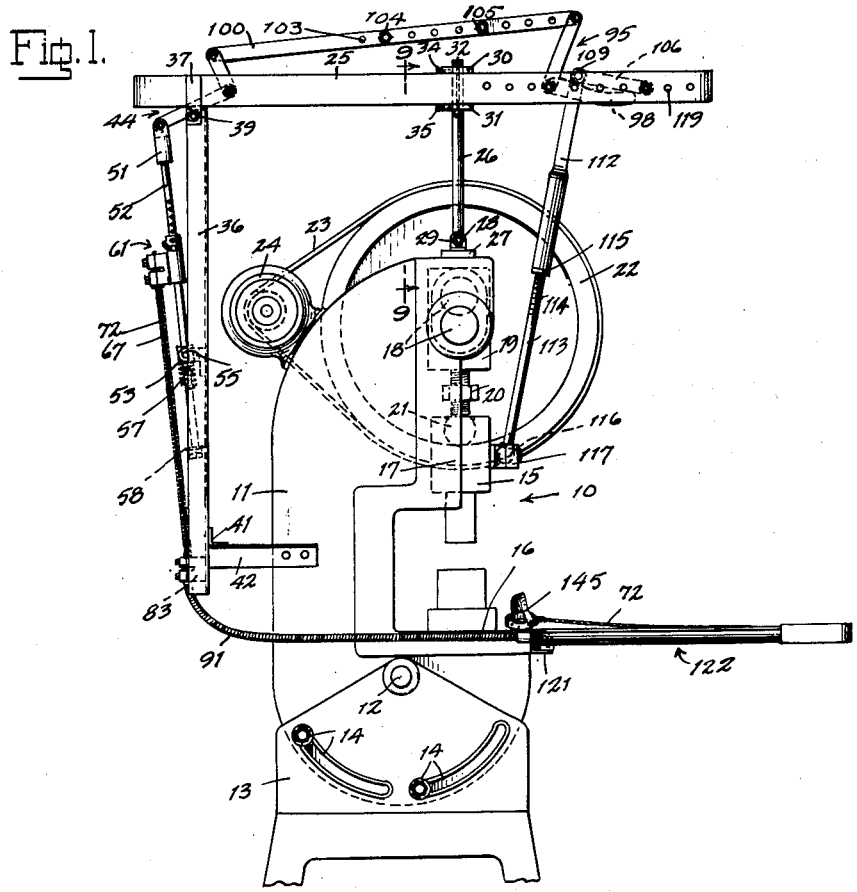
Fig. 1 is a side elevation of a press equipped with a safety guard apparatus according to the invention, the lower part of the supporting stand being broken away.
Figure 2:
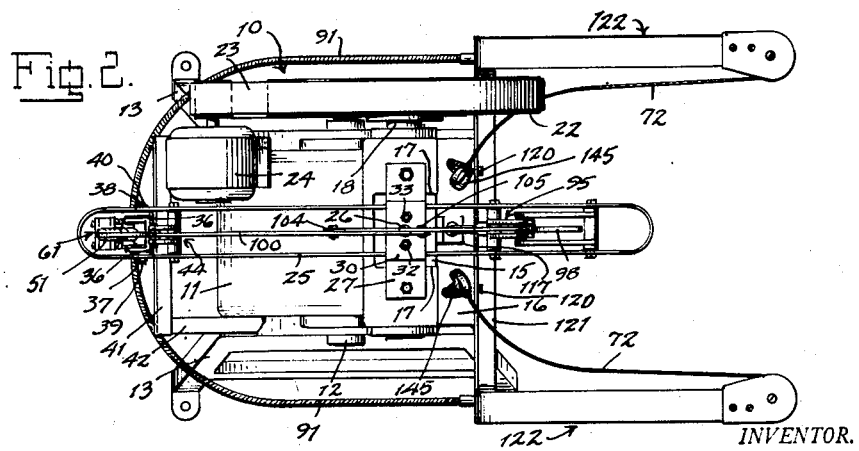
Fig. 2 is a top plan view.

Referring to the drawings, the invention is shown as applied to a standard type of reciprocating punch or stamping press 10, to which the operator feeds work pieces by hand. The main press frame 11 is pivotally mounted at 12 upon a stand 13 and may be adjusted from the vertical position, as shown, to a tilted position by means of the bolt and slot connections 14. The ram or gate 15 is mounted for reciprocation above the work holding bed 16 in suitable ways 17, reciprocating motion being imparted thereto from a crank shaft 18 carrying a head 19 which is suitably connected to the ram or gate 15 by an adjustable connecting rod 20, having a ball and socket connection 21 with the ram or gate 15. Upon the end of the crank shaft is mounted a flywheel 22 driven by a belt 23 from a motor 24 mounted upon the frame 11. It will be understood that the press is provided with the usual foot lever which operates a stop clutch connected between the crank shaft and the flywheel so that with every operation of the foot lever a single cycle of operation of the press takes place.

The safety guard apparatus comprises a frame fixed upon the press and consisting of a horizontally disposed elongated yoke frame member 25 preferably formed of a strip of strap metal having parallel spaced sides and rounded ends, and which is mounted above the press upon a vertical post 26 supported upon the upper end of the press by means of a cross plate 27 having pivot lugs 28 to which the lower end of the post is connected by a pivot pin 29. The upper end of the post is engaged for vertical adjustment through a pair of horizontal clamp plates 30 and 31 respectively engaged at the upper and lower sides of the yoke member 25 and secured thereto by a pair of vertical clamping bolts 32 and 33, the post being fixed in its position of vertical adjustment with respect to the plates 30 and 31 by set screws 34 and 35. The height of the yoke member 25 may be adjusted as desired and it may also be adjusted about the pivot 29 into inclined position, if desired.

At the rearward side of the press there is provided a vertically disposed elongated channel frame member 36 of corresponding width to the width of the yoke member 25 and having its upper end connected thereto by a pair of downwardly projecting lug straps 37 and 38 welded or otherwise suitably rigidly secured to the outer sides of the yoke member and pivotally connected at their lower projecting ends to the upper ends of said flanges of the channel member by bolt and nut connections 39 and 40. Near the lower end of the channel member 36 is secured, by welding or the like to its inner side, a horizontally disposed bar 41 of angle iron which is mounted at its ends upon a pair of angle iron horizontally extending bars 42 and 43 secured to the sides of the press frame 11.

Near the rearward end of the yoke member 25 there is provided a bell crank lever 44 pivotally mounted at its hub portion upon a headed bolt shaft 45 engaged through holes 46 in the sides of the yoke member, and having a retaining nut 47 screwed upon its threaded end. The bell crank lever 44 is provided with a single centrally disposed long arm 48 and a bifurcated short arm 49, the long arm being substantially horizontally disposed midway its swing from its lower to its upper position, as indicated by the full and dotted lines in Fig. 3, so that its outer end moves in a generally vertical direction while the upper end of its short arm moves in a generally horizontal direction. At the outer end of the arm 48 there is pivotally connected, by means of a bolt 50, a clevis end 51 of a rod 52 which is guided near its lower end in a guide block 53 pivotally mounted by means of trunnion pins 54 in a yoke-shaped bracket 55 secured to the inner side of the channel frame member 36. The block member 53 is provided at its underside with a cylindrical ribbed extension portion 56 upon which is secured the upper end of a coil buffer spring 57, and upon the lower end of the rod 52 there is provided a washer 58 secured by a pair of locknuts 59 and 60, and which in the upward movement of the rod 52 is adapted to engage and compress the buffer spring for the purpose of providing a shock absorbing limit stop for such upward movement, as will hereinafter more fully appear.

Upon the rod 52, at a point between the pivot block 53 and its upper end, there is mounted for longitudinal adjustment on the rod a connector device, indicated generally as 61, consisting of a tubular cylindrical portion 62 engaged upon the rod and a block portion 63 rigid with the portion 62. The parts 62 and 63 may be welded together, or they may be a one-piece casting. The block portion 63 is provided with a centrally disposed horizontal slot 64 and below the slot its face is provided with a pair of semi-cylindrical pockets 65—65 in which the cylindrical flanged end fittings 66—66 of a pair of elongated coil springs 67—67 are seated with their flanges in the slot 64, being secured by a clamping bar 68 having semi-cylindrical pockets 69—69 complementary to the pockets 65—65, and secured by a clamping screw 70 in its central portion screwed into the central portion of the lower part of the block member.

The upper part of the block member is provided in its forward face with a pair of grooves 71—71 axially aligned with the pockets 65—65 of the lower portion and in which the upper ends of flexible cable members 72—72 are engaged and clampingly secured by a pair of clamping blocks 73—73 having grooves 74—74 complementary to the grooves 71 and respectively secured to the block 63 by clamping screws 75—75.

The connector device is adjustable vertically upon the rod 52 and may be fixed in any position of vertical adjustment. For this purpose, the rod 52 is provided with a series of transverse holes 76, and the upper end portion of the tubular portion 62 of the connector device is provided with a pair of transverse holes 77 and 78 adapted to axially align with adjacent holes 76 of the rod. A pair of pins 79 and 80 having head ends connected by a coil spring 81 are adapted through stretching of the spring to be engaged in opposite directions through the respective holes 77 and 78 and the holes 76 aligned therewith, compression of the spring automatically retaining the pins in connecting position.

This adjustment, as will hereinafter more fully appear, adjusts the extension of the wristlets from the arm members of the device so that by simply raising and lowering the connector device upon the rod 52 the extension of the wristlets may be decreased or increased as desired. The flexible cables 72 each extend through one of the springs 67 as a tubular guide which, due to the fact that the spring is at all times under tension, prevents buckling of the cable as the arm 52 is reciprocated up and down.

Upon the lower end of each spring 67 there is provided a flanged tubular end member 82 which is secured in a clamping block member 83 mounted within the lower end portion of the channel member 36. This block member is somewhat similar to the clamping part 63 of the connector device 61, being provided with a central horizontally disposed slot 84, the forward face above the slot being provided with a pair of semi-cylindrical pockets 85—85 in which the spring end members 82—82 are seated with their flanges disposed in the slot 84, and are clamped in place by a clamping bar 86 having semi-cylindrical pockets 87—87 complementary to the pockets 85—85 and clampingly secured by a clamping screw 88.

The portion of the block 83 below the slot is similar to the portion above the slot, its forward face being provided with semi-cylindrical pockets 89—89 in which flanged end members 90—90 of a pair of flexible cable guide tubes 91—91 are seated and secured by a clamping bar 92 having semi-cylindrical pockets 93—93 complementary to the pockets 89—89 and secured by a clamping screw 94. These flexible cable guide tubes are, in effect, continuations of the cable guides provided by the springs 67, the respective cables 72 being carried therethrough to the forward side of the press where they are provided at their ends with wristlets for the respective hands of the operator, as will presently more fully appear.

Towards the forward end of the yoke frame member 25 there is provided an inverse cam member, indicated generally as 95, having its hub portion pivotally mounted upon a headed bolt shaft 96 having a retaining nut 97 screwed upon one end, its centrally disposed cam arm 98 being normally disposed in a generally horizontal direction, as shown by the full lines in Fig. 5, and its bifurcated lever arm 99, which is approximately at a right angle to the cam arm 98, extending in a generally upright direction. The short lever arm 49 of the bell crank lever 44 and the lever arm 99 of the inverse cam member 95 are connected by a connecting bar 100 having pivot bolt connections 101 and 102 with said respective lever arms, this link bar being adjustable as to length by forming it in two pieces which are overlapped and provided with a series of equally spaced holes 103, the two overlapped portions being rigidly connected by a pair of bolt and nut connections 104 and 105 engaged through spaced registering holes of the two parts of the link bar.

Forwardly of the inverse cam member there is provided a bifurcated link lever 106 having its hub portion pivotally mounted upon a headed bolt shaft 107 having a retaining nut 108 secured upon one end, its two arms extending forwardly from the hub at each side of the centrally disposed cam arm 98 and supporting at their forward ends a cam roller 109 mounted upon a headed bolt shaft 110 having a retaining nut 111 screwed upon one end. The upper yoke member 112 of a connection rod 113 is pivotally connected to the bolt shaft 107 of the link lever by engagement of its two side portions between the roller 109 and the side arms of the link lever. A series of holes 107a in the lever 106 enables adjustable connection of the yoke member 112 thereto so that the full swing of the roller 109 may be effected with shorter strokes of the connection rod 113.

The connection rod 113 is adjustably connected to the yoke member 112 by having its upper end portion threaded as at 114 and screwed into the shank portion of the yoke member, its position of vertical adjustment being fixed by a locknut 115. This vertical length adjustment of the connection rod adjusts the effective movement of the cam member to thereby control the extent of withdrawal movement of the wristlets, as will presently more fully appear. At its lower end, the connection rod is provided with a ball end member 116 swively mounted in a bearing block 117 secured by bolts 118 to the forward side of the ram or gate 15 of the press.

A series of equally spaced bolt-receiving holes 119 in the sides of the yoke frame 25 permits adjustment of the location of the cam mechanism upon lengthening or shortening of the link bar 100. This adjustment, together with the adjustable connection of the part 26 with the yoke frame, enables convenient adaptation of the guard apparatus to different sizes and types of presses.

The inverse cam is designed so that it has a quick full movement at the beginning of the downward stroke of the press and consequently at the beginning of downward movement of the connecting rod 113, the cam arm 98 moving from a substantially horizontal position, as shown in Fig. 5 in full lines, to the downwardly extend-position, as shown by the dot-and-dash lines, the swinging movement of the cam arm having been completed when the roller 109 reached an intermediate point in its travel indicated at A, consequently there bing no movement of the cam arm during the remainder of the downward movement of the roller due to the fact that part of the cam arm engaged thereby is curved in concentric relation with the arc of movement of the roller. Thus, the pull-back of the wristlets takes place at the beginning of the downward stroke of the press with a quick gradually decelerating movement. The effective withdrawal movement during this period is represented by the vertical distance that the rod 52 is moved by the bell crank lever 44 as the latter is swung from the full line to the dotted line position, as shown in Fig. 3, through its connection by the link bar 100 with the inverse cam.

In order to increase or decrease this withdrawal movement, it is only necessary to lengthen or shorten the connection rod 113, through its threaded connection with the yoke member 112. It will be observed that the springs 67 exert a constant pull downwardly upon the rod 52 to return it to its down position, and through the bell crank 44 and the link bar 100 the cam arm 98 is constantly drawn in counter-clockwise direction into engagement with the roller 109. As the point A represents the point at which withdrawal movement of the wristlets will stop, any adjustment of the normal position of the roller 109 above this point will change the effective withdrawal movement, upward adjustment of the roller 109 allowing the cam to swing further upwardly in a counter-clockwise direction so that it has an increased swing from its normal position to its full throw position, and downward adjustment of the roller 109 decreasing the swing so that when the downward adjustment coincides with the point A there is no withdrawal movement of the wristlets. It is presumed that under such condition the wristlets will be set in such relation to the press that the hands will be out of danger but will at the same time permit the operator to manipulate and hold the work.

Upon the forward side of the bed 16 of the press there is secured by bolts 120 an angle iron bar 121 projected at each side of the bed and having adjustably connected to each of its ends an arm, generally designated as 122, the respective arms being disposed at each side of the operator of the press standing or sitting in working position in front of the bed. The outer ends of the arms are at points a substantial distance rearwardly and somewhat downwardly of the normal position of the operator's hands in placing work in the press, so that the cables for withdrawing the wristlets, which are guided through the arms and extend from their outer ends to the wristlets, will in their withdrawing operation pull the hands outwardly from the press in a manner which enables the elbows to bend naturally without undue shock to the operator or interference with his working position in front of the press. It should be pointed out that the operator will normally withdraw his hands to a safe position before operation of the press, so that he will not experience a withdrawing pull on the wristlets, except at such times as he has failed to withdraw his hands.

The arms 122 are identical in construction, except that one is left hand and one is right hand, so that only one will be described in detail. Each arm comprises a pair of elongated flat straight metal strips 123 and 124 disposed in parallel relation, one above the other, with a rigid metallic tube 125 interposed between them adjacent their outer longitudinal edges, and rigidly connected to the strips as by welding. At the mounting end of the arm there is provided an end plate 126 of rectangular form welded to the ends of the strips 123 and 124 and extended below the lower strip 124, an opening 127 being provided therein through which a reduced end portion 128 of the tube 125 is projected. Upon the inner side of the mounting end of the arm there is secured as by welding a quadrant plate 129 having a pivot hole 130 and an arcuate slot 131 concentric thereto. This quadrant plate is connected for angular adjustment to a similar quadrant plate 132 provided with a pivot hole 133 and an arcuate slot 134 and secured as by welding on the end of the angle iron bar 121. The arm is connected to the quadrant plate 132 by a pivot bolt and nut 135 engaging the holes 130 and 133 of the quadrant plates and by a fastening bolt and nut 136 engaging the arcuate slots 131 and 134. In the normal upright position of the press the arms 122 are in a horizontal position, as shown in Fig. 1. In the event that the press is tilted about the pivot supports 12, the arms will be adjusted into horizontal position by swinging adjustment of the quadrant 129 with respect to the quadrant 132. Also, the arms may, if desired, be swung either upwardly or downwardly to a vertical position when the press is not in use.

Between the outer ends of the strips 123 and 124 a grooved cable guide pulley 137 is rotatably mounted upon a pivot shaft 138, the axis of the guide tube 125 being tangential to the pulley groove. The pulley is enclosed in a housing 139 secured upon the ends of the strips 123 and 124 by screws 140, the housing having an upper wall 141 and a peripheral wall 142 extending in parallel relation along the outer side of the arm, in concentric relation about the pulley wheel, and in inwardly inclined relation along the inner side of the arm, the inclined inner side of this wall having a slot 142a through which the cable extends from the pulley.

The flexible guide tubes 91 at each side are connected at their forward ends to the arms by cylindrical end members 143 secured to the projecting ends 128 of the tubes 125 by set screws 144. Thus, the cable is continuously guided from the connector member 61 to the slot 142a, first through the springs 67, then through the flexible guide tubes 91, then through the rigid guide tubes 125, and finally about the pulley 137. Upon the ends of the cables there are provided wristlets 145 which may be of any conventional type, usually consisting of a circular band for engagement about the wrist and a U-shaped band connected to the circular band for engagement between the thumb and forefinger.

In Figs. 11 and 12 there is illustrated a modified form of inverse cam mechanism, in which provision is made for a greater relative movement of the connecting rod 113 in the case of a press having a relatively long stroke. The cam arm 98 of the cam lever 95 is substantially longer than in the first embodiment as shown in Fig. 5, and the lever arm 99 is at a smaller angle to the cam arm and is substantially shorter.

Instead of the link lever 106, a link lever 106a is provided having a pair of bifurcated arms 146 and 147 which, viewed in side elevation, present a V-formation, these arms being provided upon their respective outer ends with cam engaging rollers 148 and 149 pivotally supported upon bolt shafts 150 and 151. The yoke member 112 of the connector rod 113 is pivotally connected to the roller supporting shaft 151 of the upper arm 147. In the normal position, the upper roller 149 is out of engagement with the cam while the lower roller 148 is in engagement, and this lower roller imparts the swinging movement to the cam lever upon the initial downward movement of the ram or gate 15 of the press.

As the lower roller 149 moves downwardly, the upper roller comes into contact with the cam arm and remains in contact therewith to the end of the downward stroke of the press, the lower roller 149 in the meantime moving out of engagement with the end of the cam arm, as shown by the dot-and-dash lines. Upon return movement, the upper roller 148 remains in contact with the arcuate surface of the cam to hold the position of the cam arm until the lower roller 149 re-engages the cam arm, whereupon the parts move to their normal upper position, as shown by the full lines. An increase or decrease in the cam arm movement is brought about by lengthening or shortening adjustment of the connecting rod 113 in similar manner to the cam mechanism illustrated in Fig. 5. A series of holes 152 in the upper arm of the link lever 106a enables adjustable connection of the yoke member 112 thereto so that full swing of the rollers may be effected with shorter strokes of the connecting rod 113.

Having thus set forth the nature of my invention, what I claim is:

1. In a safety guard for a press, wherein the press comprises a reciprocating part and a bed, the combination comprising a substantially horizontal frame member, means for mounting said frame member above the press, a substantially upright frame member connected adjacent one end of said horizontal frame member, movement transmitting means carried by said horizontal frame member, a drive member connected at one of its ends to said movement transmitting means and connectable at its other end to said reciprocating press part, a reciprocating member carried by said upright frame member connected at its upper end to said movement transmitting means whereby lifting movement is imparted thereto upon downward movement of said reciprocating press part, a connector device mounted on said reciprocating member for vertical adjustment thereon, securing means for securing the position of adjustment of said connector device, spring means exerting a downward force on said reciprocating member, a pair of cables each respectively connected at one end to said connector device, and wristlets respectively connected to the other ends of said cables.

2. In a safety guard for a press, wherein the press comprises a reciprocating part and a bed, the combination comprising a substantially horizontal frame member, means for mounting said frame member above the press, a substantially upright frame member connected adjacent one end of said horizontal frame member, movement transmitting means carried by said horizontal frame member, a drive member connected at one of its ends to said movement transmitting means and connectable at its other end to said reciprocating press part, a rod guide member carried by said upright frame member, a reciprocating rod movable through said guide member, said rod being connected at its upper end to said movement transmitting means whereby lifting movement is imparted thereto upon downward movement of said reciprocating press part, a resilient buffer connected to the under side of said guide member, buffer engaging means carried by said rod, a connector device mounted on said reciprocating rod for vertical adjustment thereon, securing means for securing the position of adjustment of said connector device, spring means exerting a downward force on said reciprocating rod, a pair of cables each respectively connected at one end to said connector device, and wristlets respectively connected to the other ends of said cables.

3. The invention as defined in claim 2, further characterized in that said buffer comprises a coil spring.

4. In a safety guard for a press, wherein the press comprises a reciprocating part and a bed, the combination comprising a substantially horizontal frame member, means for mounting said frame member above the press, a substantially upright frame member connected adjacent one end of said horizontal frame member, movement transmitting means carried by said horizontal frame member, a drive member connected at one of its ends to said movement transmitting means and connectable at its other end to said reciprocating press part, a reciprocating rod carried by said upright frame member connected at its upper end to said movement transmitting means whereby lifting movement is imparted thereto upon downward movement of said reciprocating press part, a first connector device carried by said reciprocating rod, a second connector device connected to said upright frame member, a pair of coil springs having their upper ends connected to said first connector device and their lower ends connected to said second connector device and adapted to exert a downward force upon said reciprocating rod, a pair of cables each respectively connected at one end to said first connector device and extending through said respective springs as guides, and wristlets respectively connected to the other ends of said cables.

5. The invention as defined in claim 4, further characterized in that said first connector device is longitudinally adjustable on said rod.

6. The invention as defined in claim 4, further characterized in that said first connector device includes clamping means for said upper spring ends and separate clamping means for said cables.

7. In a safety guard for a press, wherein the press comprises a reciprocating part and a bed, the combination comprising a substantially horizontal frame member, means for mounting said frame member above the press, a substantially upright frame member connected adjacent one end of said horizontal frame member, movement imparting lever means carried by said horizontal frame member comprising a cam lever, a roller carrying lever engaged with said cam lever, a bell crank lever, a link connecting said cam lever and said bell crank lever, a drive member connected at one of its ends to said roller carrying lever and connectable at its other end to said reciprocating press part, a reciprocating member carried by said upright frame member connected at its upper end to said bell crank lever whereby lifting movement is imparted thereto upon downward movement of said reciprocating part of the press, a connector device carried by said reciprocating member, spring means exerting a downward force on said reciprocating member, a pair of cables each respectively connected at one end to said first connector device, and wristlets respectively connected to the other ends of said cables.

8. The invention as defined in claim 7, further characterized in that said drive member is longitudinally adjustable to vary the distance between its connection with said roller carrying lever and said reciprocating press part.

9. The invention as defined in claim 7, further characterized in that said drive member is adjustably connectable to said roller carrying lever at points between its swinging axis and its roller.

10. The invention as defined in claim 7, further characterized in that said cam lever includes an operating portion engageable by said roller to cause swinging movement of said cam lever and an arcuate portion extending from said operating portion, said arcuate portion being concentric to the path of movement of said roller in the moved position of said cam lever whereby following movement of said cam lever through initial movement of said roller it remains stationary during the continued movement of said roller.

11. The invention as defined in claim 7, further characterized in that said roller carrying lever comprises a pair of angularly spaced arms, each carrying a roller for successive engagement with said cam lever.

12. In a safety guard for a press, wherein the press comprises a reciprocating part and a bed, the combination comprising a substantially horizontal frame member, means for mounting said frame member above the press, a substantially upright frame member connected adjacent one end of said horizontal frame member, means for mounting said substantially upright frame member at the rearward side of the press, movement transmitting means carried by said horizontal frame member, a drive member connected at one of its ends to said movement transmitting means and connectable at its other end to said reciprocating press part, a reciprocating member carried by said upright frame member connected at its upper end to said movement transmitting means whereby lifting movement is imparted thereto upon downward movement of said reciprocating press part, a connector device mounted on said reciprocating member for vertical adjustment thereon, securing means for securing the position of adjustment of said connector device, a pair of cables each respectively connected at one end to said connector device, a pair of arm members adapted to be mounted in forwardly extending relation upon the forward side of the press at each side of the press operator, guide rollers respectively carried by the outer ends of said arms, said cables respectively extending from the rearward side of the press forwardly through said arms and about said rollers, and wristlets respectively connected to the other ends of said cables.

13. The invention as defined in claim 12, further characterized in that said arms are angularly adjustable relatively to the press.

14. In a safety guard for a press, wherein the press comprises a reciprocating part and a bed, the combination comprising a substantially horizontal frame member, means for mounting said frame member above the press, a substantially upright frame member connected adjacent one end of said horizontal frame member, means for mounting said substantially upright frame member at the rearward side of the press, movement transmitting means carried by said horizontal frame member, a drive member connected at one of its ends to said movement transmitting means and connectable at its other end to said reciprocating press part, a reciprocating member carried by said vertical frame member, connected at its upper end to said movement transmitting means whereby lifting movement is imparted thereto upon downward movement of said reciprocating press part, a connector device carried by said reciprocating member, a pair of cables each respectively connected at one end to said connector device, a pair of arm members adapted to be mounted in forwardly extending relation upon the forward side of the press at each side of the press operator, a pair of tubular guide means extending between said substantially upright frame member and said respective arms, guide rollers respectively carried by the outer ends of said arms, said cables extending from the rearward side of the press forwardly through said tubular guide means and said arms and about said rollers, and wristlets respectively connected to the other ends of said cables.

15. In a safety guard for a press, wherein the press comprises a reciprocating part and a bed, the combination comprising a substantially horizontal frame member, means for mounting said frame member above the press, a substantially upright frame member connected adjacent one end to said horizontal frame member, means for mounting said substantially upright frame member at the rearward side of the press, movement transmitting means carried by said horizontal frame member, a drive member connected at one of its ends to said movement transmitting means and connectable at its other end to the reciprocating press part, a reciprocating member carried by said upright frame member connected at its upper end to said movement transmitting means whereby lifting movement is imparted thereto upon downward movement of said reciprocating press part, a first connector device carried by said reciprocating member, a second connector device connected to said upright frame member, a pair of coil springs connected between said first connector device and said second connector device adapted to exert a downward force upon said reciprocating member, a pair of cables each respectively connected at one end to said first connector device and extending through said respective springs as guides, a pair of arm members adapted to be mounted in forwardly extending relation upon the forward side of the press at each side of the press operator, a pair of tubular guide means extending between said second connector device and said respective arms, guide rollers respectively carried by the outer ends of said arms, said cables extending from said springs forwardly through said tubular guide means and said arms and about said roller, and wristlets connected to the other ends of said cables.

References Cited in the file of this patent

UNITED STATES PATENTS

| | | |
|---|---|---|
| 625,600 | Pohle | May 23, 1899 |
| 1,371,426 | Jonor et al. | Mar. 15, 1921 |
| 2,011,047 | Gaul | Aug. 13, 1935 |
| 2,305,472 | Hall | Dec. 15, 1942 |
| 2,427,928 | Shaw | Sept. 23, 1947 |
| 2,429,065 | Korkowski | Oct. 14, 1947 |
| 2,582,023 | Ferrer | Jan. 8, 1952 |